United States Patent [19]
Kratz

[11] 4,250,911
[45] Feb. 17, 1981

[54] CHEMICAL FEEDER WITH DISPOSABLE CHEMICAL CONTAINER

[76] Inventor: David W. Kratz, 17 Country Life Acres, St. Louis, Mo. 63131

[21] Appl. No.: 79,691

[22] Filed: Sep. 28, 1979

Related U.S. Application Data

[63] Continuation-in-part of Ser. No. 899,265, Apr. 24, 1978.

[51] Int. Cl.³ ................................ B01D 11/02
[52] U.S. Cl. ................................ 137/268; 422/282; 422/264; 239/310
[58] Field of Search ................ 137/268; 422/264, 274, 422/275, 276, 281, 282; 239/310

[56] References Cited

U.S. PATENT DOCUMENTS

| | | | |
|---|---|---|---|
| 3,416,897 | 12/1968 | Long | 422/264 |
| 3,612,080 | 10/1971 | Schneider | 137/268 X |
| 3,899,425 | 8/1975 | Lewis | 422/264 UX |

*Primary Examiner*—Alan Cohan
*Attorney, Agent, or Firm*—Ralph W. Kalish; Peter S. Gilster

[57] ABSTRACT

The combination of a chemical feeder for liquid circulating systems comprising a casing provided with a vertically adjustable weir, and a disposable container for chemicals for treatment of the liquid which container is receivable within the casing. The container is provided with an opening for extension therethrough of the weir to a preselected height consonant with the desired concentration of the solution to be formed. The liquid is introduced into said container from the feeder for dissolution of the chemical with the resulting solution flowing downwardly through the weir for ultimate discharge to the associated system.

6 Claims, 8 Drawing Figures

CHEMICAL FEEDER WITH DISPOSABLE CHEMICAL CONTAINER

This application is a continuation-in-part of copending application Ser. No. 899,265 filed Apr. 24, 1978.

BACKGROUND AND SUMMARY OF THE INVENTION

This invention relates in general to liquid treatment and, more particularly, to a chemical feeder with a disposable chemical container for use in a system for treating liquid circulating therethrough.

Heretofore, various efforts have been made to develop disposable or throw-away containers of canisters for treatment chemicals utilized in liquid circulating systems, such as those for potable water, for swimming pools and the like. Such containers or canisters are normally used in conjunction with a chemical feeding apparatus for delivering the liquid to be treated to such containers and being adapted for conducting the developed solution into the related system. The liquid level within such containers, which is determinative of the concentration of the formed solution, is generally controlled by the user punching out or severing one of several vertically arranged scored members provided in the side wall of the container. This is a relatively inexact method of establishing the concentration since the number of such scored members are limited and each must be of reasonable size for effectiveness. Furthermore, there are inherent variations in the containers so that the removal of a corresponding scored member in a replacement container or canister does not necessarily assure of maintenance of the concentration provided by the precourser container. Accordingly, the historic use of scored portions has been with the recognition of the relative inexactness in concentration permitted thereby.

Another type of disposable container is one adapted for threaded engagement within the feeding apparatus and which also embodies the aforementioned scored portions. Thus, the threading is one more effort required by the user and one which entails great care in installation in order to assure that the removed scoring will be in the appropriate disposition for the selected concentration. But none of such prior efforts have provided fine adjustment as to concentration nor assurance that a subsequent container will be so disposed as to produce the same concentration as its predecessor.

It is, therefore, an object of the present invention to provide a chemical feeder for a liquid circulating system which feeder is adapted to receive a disposable or replaceable container of chemicals for treatment of the liquid and with there being unique level control means for determining the concentration of liquid admitted to the container.

It is another object of the present invention to provide a chemical feeder of the type stated having a liquid level control member penetrable into the disposable container to a predetermined height which is adapted to retain its condition of adjustment so that with a succeeding container disposed thereover the same concentration of solution is reliably maintained.

It is a further object of the present invention to provide a chemical feeder of the type stated wherein the disposition of the container within the feeder does not require any physical alteration of the container nor any interengagement of the same therewith.

It is a further object of the invention to provide a chemical feeder of the type stated which, by virtue of unique cooperation with a disposable chemical container, is productive of most efficacious operation in providing the treatment agent to the associated system which permits of a replenishment of supply of the requisite chemical in a most facile manner.

It is a still further object of the present invention to provide a chemical feeder of the character stated which is adapted for substantially extremely fine adjustment for concentration control with such adjustments being accurate and easily effected. Heretofore, only a limited number of concentrations had been obtainable in related structures but with the present invention the range of adjustment is unusually extensive.

It is another object of the present invention to provide a feeder of the character stated which is most economically produced, as well as being most effective and economical in operation; which is constituted of a simplicity of components so as to be resistant to breakdown and which is exceedingly durable in usage.

DESCRIPTION OF THE PREFERRED EMBODIMENT

Figure 1:
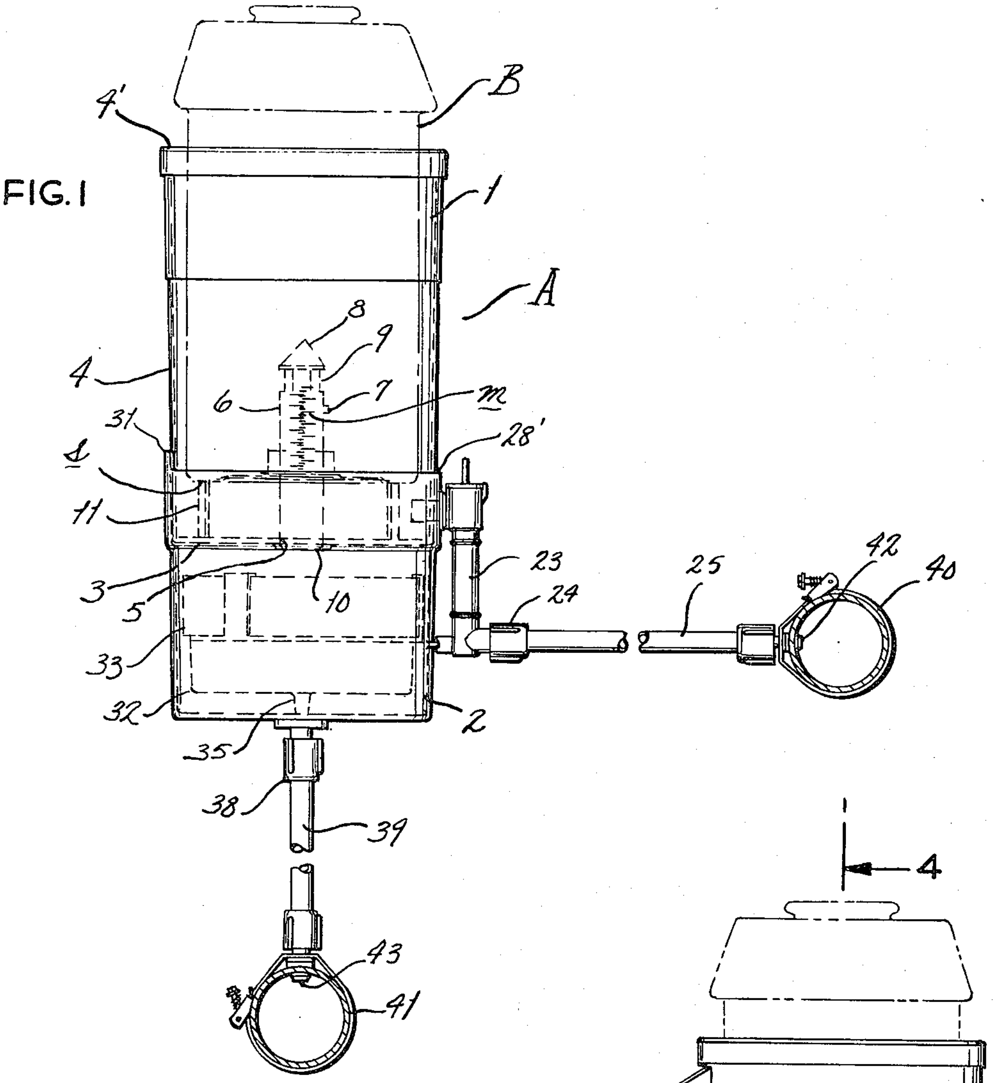
FIG. 1 is a side elevational view of a chemical feeder provided with a disposable chemical container constructed in accordance with and embodying the present invention.
Figure 3:
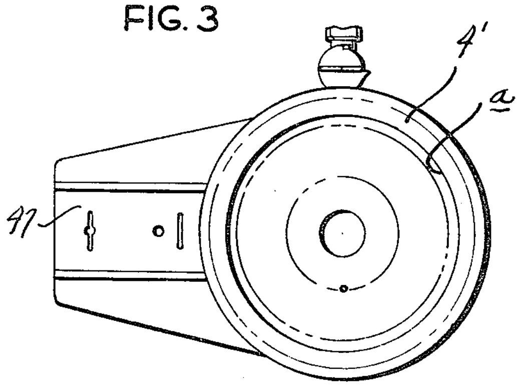
FIG. 3 is a top plan view.
Figure 2:
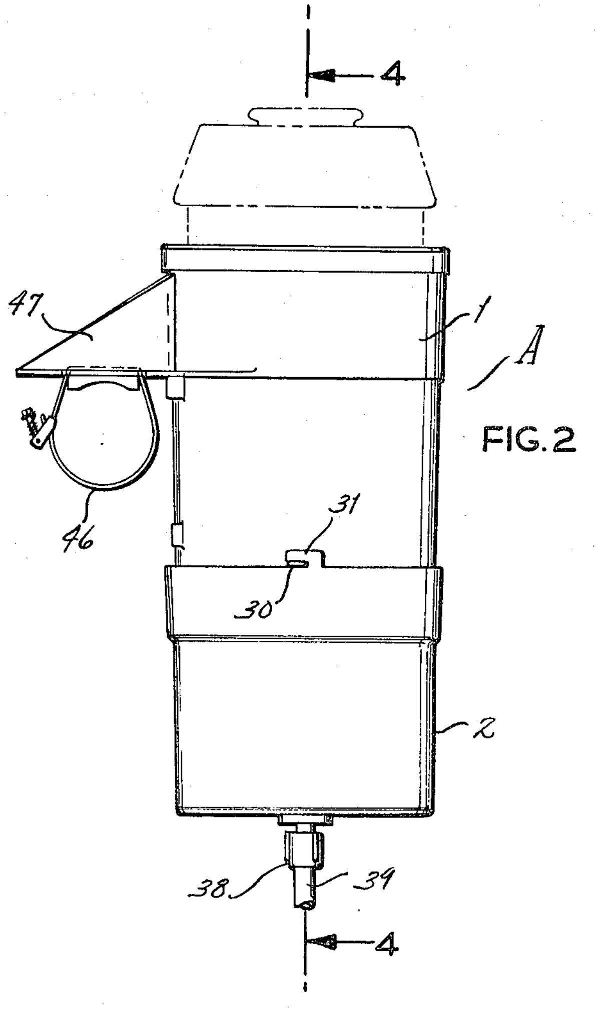
FIG. 2 is a side elevational view taken at an angle of 90° to FIG. 1.

Referring now by reference characters to the drawings which illustrate the preferred embodiment of the present invention, A generally designates a chemical feeder of the type primarily designed for use with liquid circulating systems, such as for potable water, swimming pools and the like, in order to effect the introduction of liquid treatment material thereinto, and comprises essentially an upper container- or receptacle-receiving casing 1 and a float-chamber-forming lower housing 2 adapted to supportingly accept the lower portion of said casing 1.

Figure 4:
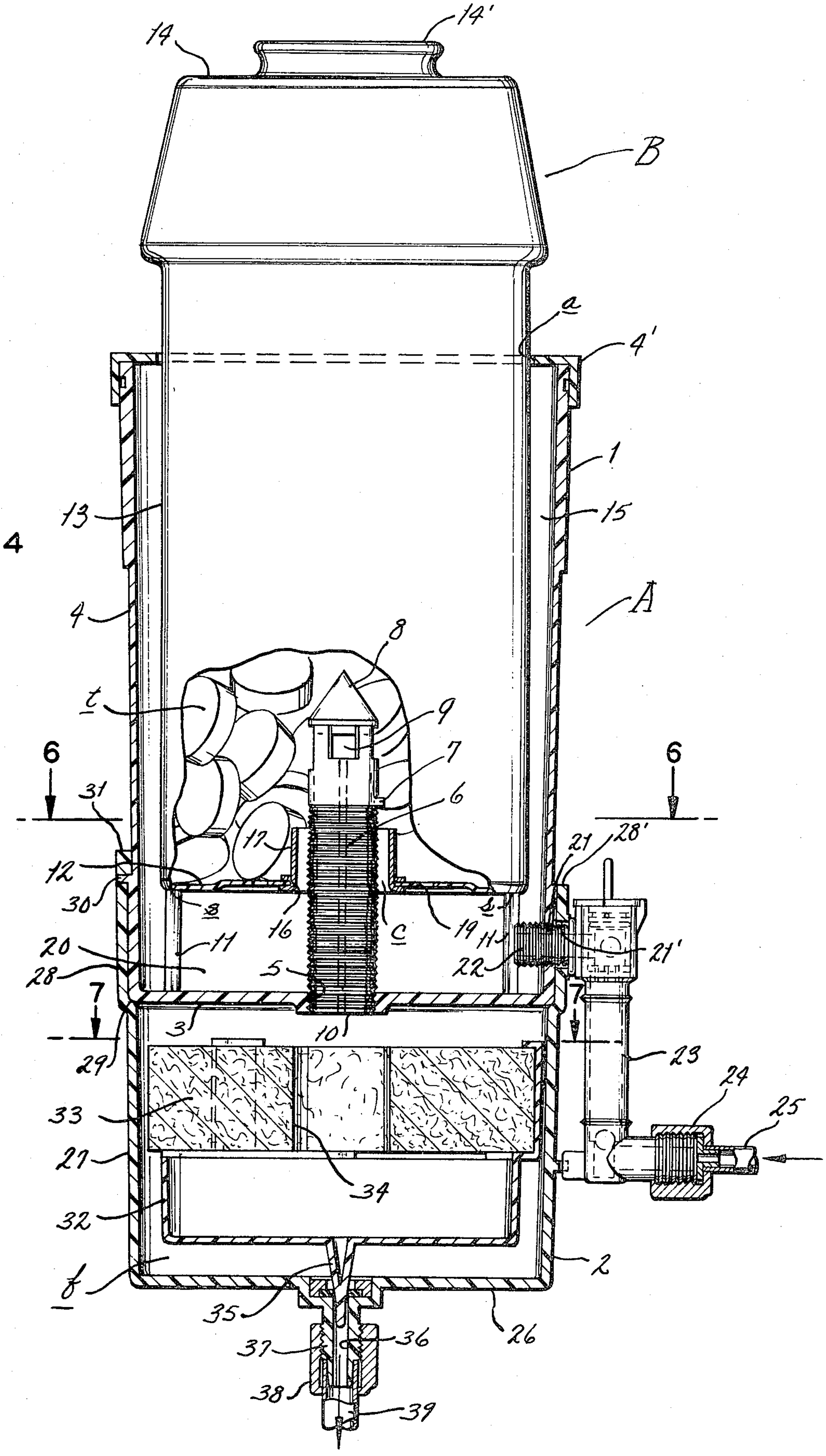
FIG. 4 is an enlarged vertical transverse sectional view taken on the line 4—4 of FIG. 2 illustrating the weir in full upward position.
Figure 5:
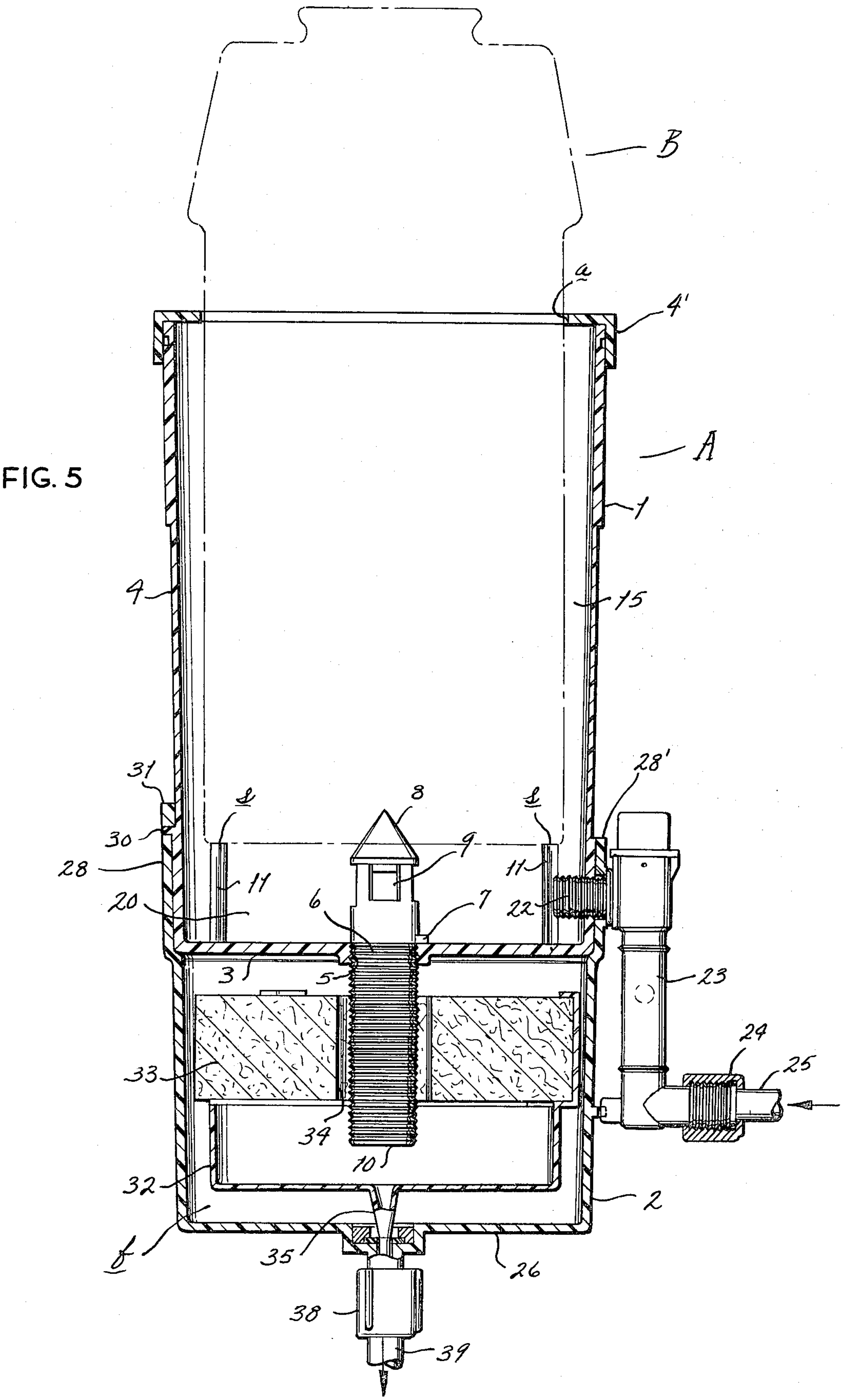
FIG. 5 is an enlarged vertical transverse sectional view taken substantially on the line 5—5 of FIG. 2 but illustrating the weir in full downward position.
Figure 6:
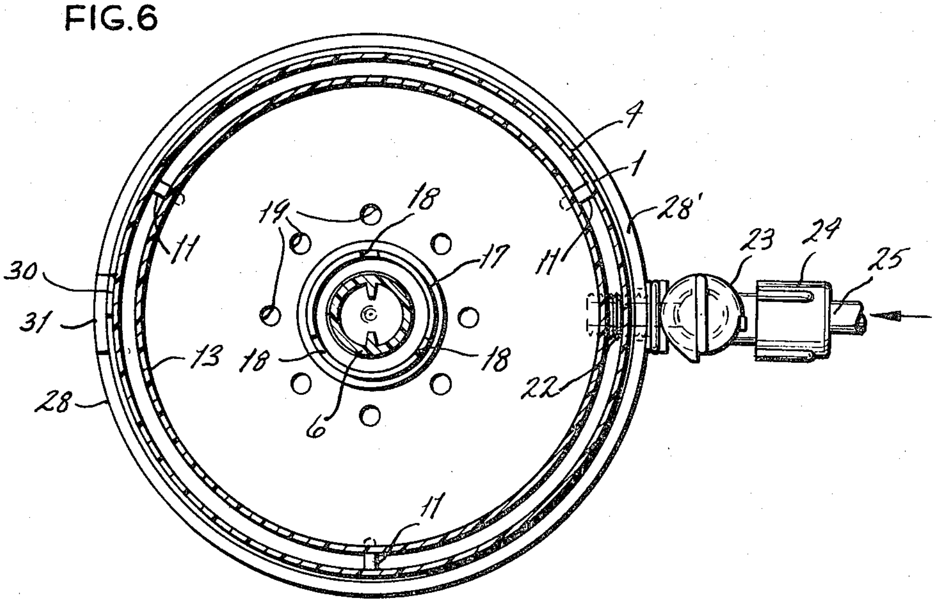
FIG. 6 is a horizontal transverse sectional view taken on the line 6—6 of FIG. 4.

Casing 1 is of general cylindrical form having a base wall 3 and an upstanding annular side wall 4 which may taper slightly outwardly toward the upper end thereof, and with said casing 1 being normally open to the top for receiving a cap 4' having an enlarged aperture a. Formed centrally in base wall 3 is a threaded aperture 5 within which is engaged the external threads of an elongated, adjustable weir or stand-pipe 6 presented coaxially of casing 1. Weir 6 is of predetermined length for liquid level control for purposes presently appearing, and the same may be easily vertically threaded between full "up" position as shown in FIG. 4 where the lower end face thereof is substantially aligned with the under face of bottom wall 3 and full "down" position as shown in FIG. 5 wherein the lower end portion of said weir projects into housing 2. A stop 7 projects radially outwardly from the upper side portion of weir 6 for abutment against the upper face of bottom wall 3 thereby determining the limit of downward adjustment (see FIG. 5). The upper end 8 of weir 6 is closed, and may be of tapered or conical form for promoting flow thereover as well as to facilitate penetration within the chemical provided in a disposable container as will be more fully described hereinbelow. Immediately below upper end 8 weir 6 is provided with a plurality of circumferentially spaced-apart, inlet ports 9 effecting communication between the exterior and the inner bore of weir 6. The lower end 10 of weir 6 constitutes a liquid outlet port. It is, of course, recognized that the thickness, pitch and helical angle of the external threads of weir 6 may be of any desired extent. However, for purposes of illustration, weir 6 may contain threading so as to provide 16 threads per inch whereby one full rotation of weir 6 will permit of a 1/16" adjustment in the selected direction.

Integrally formed on the lower inner face of side wall 4 is a plurality of circumferentially spaced-apart bosses 11, the upper ends of which constitute support shoulder s for a chemical container B. Said container B is also of general cylindrical contour having a bottom wall 12, side wall 13 and top wall 14 adapted to receive an upper end closure 14'. Container B is preferably fabricated of a suitable, low cost material, such as, for instance, polyethylene, or any other suitable material which is serviceable for the intended operation and, yet, renders container B disposable upon exhaustion of its chemical supply. As may be easily seen in the drawings, container B has an outside diameter less than the inside diameter of casing 1 so that when the former is in operative position, that is, disposed upon bosses 11, a volume or spacing 15 will be developed between the outer face of container B and the inner face of casing 1 thoughout the entirety of the length thereof. Centrally of bottom wall 12 there is provided an opening 16 in alignment with aperture 5 and of greater diameter than the outside diameter of weir 6 so that liquid may pass freely therebetween, as at c, for purposes below. Bottom wall 12 of container B is also provided with a plurality of openings 19 disposed radially outwardly and encirclingly of opening 16; said openings 19 being of relatively smaller diameter. Suitably affixed to container bottom wall 12 and extending through, and upwardly of, opening 16, is a slotted sleeve 17 being of relatively short height as compared to the length of weir 6 so that the latter, when in full "up" position, will extend vertically upwardly therebeyond; it being observed, however, that said sleeve does not materially reduce the transverse extent of spacing c. As will be shown below, sleeve 17 is a feature which though useful is not indispensible to the effective operation of the present invention. Said sleeve 17 is shown as possessing spaced, vertical slots 18 which are three in number, but it will be apparent that a lesser or greater number may be provided without effect upon the operation of said sleeve 17. Each slot 18 extends from bottom wall 12 to the upper end of sleeve 17 and with the intervening portions being of such angle so that slots 18 are of a width which prevents any flow therethrough of partially dissolved chemical fragments. Thus, container B is designed to present a reservoir for the liquid treatment compound, generally indicated at t, such as of the type utilized for swimming pools which may be calcium hypochlorite, trichloro-s-triazainetrione, or any other suitable chlorine-providing compound; and with the same being in solid tabular form, with the diameter being in the order of approximately 1" and with the thickness thereof being about ½". Such dimensions are clearly not critical, but are merely exemplary as constituting a currently popular size. Accordingly, it is understood that the treatment material may be any other compounds compatible with the particular liquid system in question and may be in such solid form as selected.

Side wall 13 of casing 1 may be provided, as by any suitable means, such as by embossing, molding, or otherwise inscribing thereon, a vertically progressing scale or series of gradation marks, as at m, which progress upwardly from container base wall 12 and constitute liquid level indicators which involve accompanying numerals corresponding to the rate of treatment compound being delivered. Scale m coordinates with adjustable weir; with the upper limit of said scale m being aligned with the inlet ports 9 of weir 6 when the same is in full "up" position (FIG. 4) and, conversely, with the lower terminal of scale m being aligned with the said ports when the latter is in full "down" position (see FIG. 5). Thus, scale m reflects the unusual increments of adjustment capable of provision by the operation of weir 6, which, as stated above, may be finely adjusted within increments of 1/16". The utilization of scale m will be more apparent from the description below.

Container B provides a pre-usage, independent repository for treatment compound and during usage constitutes a dissolution compartment. Prior to use, container B may be stored easily in any suitable location, and with there being any convenient type of readily displaceable closure across opening 16, such as, tape or the like to prevent the inadvertent admission of moisture as well as inhibit any inadvertent loss of compound therethrough. But based upon the diameter of opening 16 and/or slotted sleeve 17, the chemical will not normally move therethrough because of its relative size. In usage, with weir 6 having been previously disposed in a predetermined state of vertical adjustment, the closure (not shown) for opening 16 in container B is removed, and the container is inserted into casing 1 through the aperture a; with the upper end portion of weir 6 passing relatively upwardly through said opening 16, past sleeve 17 and into the body of the treatment compound t within the interior of container B. The conical or tapered upper end configuration of weir 6 facilitates its passage into the chemical compound supply. The annular spacing c between weir 6 and sleeve 17 is of such transverse extent so as to prevent the undesired movement therethrough of partially dissolved compound fragments. It will be noted that with container B resting upon boss shoulder s, bottom wall 12 will cooperate with base wall 3 bosses 11, and the included lower end portions of side wall 4 of feeder A to define a chamber 20 which in its outer upper side portion is continuous with volume 15. Engaged within a threaded opening 21 formed in the lower side wall portion of side wall 4 of feeder A is a discharge conduit of a flow meter 23 which latter, at its lower end, as by means of a coupling 24, is engaged to an inlet tube 25, as formed of plastic or other flexible material. Flow meter 23 does not form a part of the present invention and may be of the same structure and operate in the same manner as the flow meter set forth and described in the above-identified copending application, Ser. No. 899,265. Flow meter 23 thus controls the rate of flow of incoming liquid to feeder A so that with such flow rate being constant, the quantity of compound to be dissolved can be determined to present the concentration desired for the needs of the associated system.

Housing 2 is also of general cylindrical form having a base wall 26 and an annular side wall 27 which may taper upwardly and outwardly, the upper portion of the latter constituting an integral collar 28 having an inside diameter greater than that of the lower portion, but yet being substantially equal to the outside diameter of the lower end of casing 1 for telescopingly, snugly accepting such casing lower end portion for supported disposition of the same upon a shallow annular shoulder 29 developed by an offset of collar 28 with respect to the underlying portion of side wall 27. Projecting radially outwardly from side wall 4 of casing 1 for travel relatively along the upper edge of collar 28, as at 28', during relative rotative movement of casing 1 with respect to housing 2, is a locking finger 30 for latching engagement within a keeper 31 extending upwardly from said edge 28'. The last-mentioned engagement assures of appropriate relative positioning of casing 1 and housing 2 so that opening 21 will be in registration with an aperture 21' in collar 28 for receiving discharge conduit 22 of flow meter 23. It will thus be seen that the lower portion of side wall 27, base wall 26 of housing 2, and base wall 3 of casing 1 coact to define a throat chamber f for a float valve 32 carrying a float weight 33 which centrally is provided with enlarged through-opening 34 for unrestricted relative vertical movement therein of the lower end portion of weir 6 when in adjusted lower position (see FIG. 5). Float valve 32 does not form a part of the present invention and is of the construction and design set forth and described in the aforesaid copending application Ser. No. 899,265.

Figure 7:
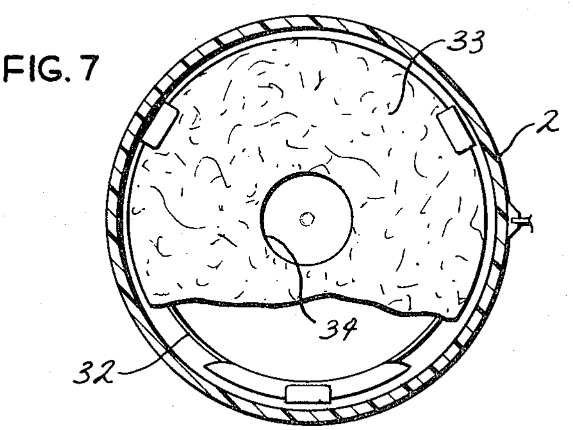
FIG. 7 is a horizontal transverse sectional view taken on the line 7—7 of FIG. 4.

Projecting from the under face of float valve 32 is a needle valve 35 flor flow occluding extension into the bore 36 of a fitting 37 which latter is secured to a coupler 38 for interconnection with a discharge pipe 39, as of flexible hosing. Feeder A is adapted for securement to suitable components of the particular system within which it is incorporated as by adjustable clamping straps 40,41, respectively, engaged to adapters 42,43 mounted upon an inlet tube 25 and discharge pipe 39, respectively, for securement to a suction hose 40 and a return hose 45, respectively, (FIG. 7) within a liquid circulating system, such as a swimming pool, indicated generally S.

Figure 8:
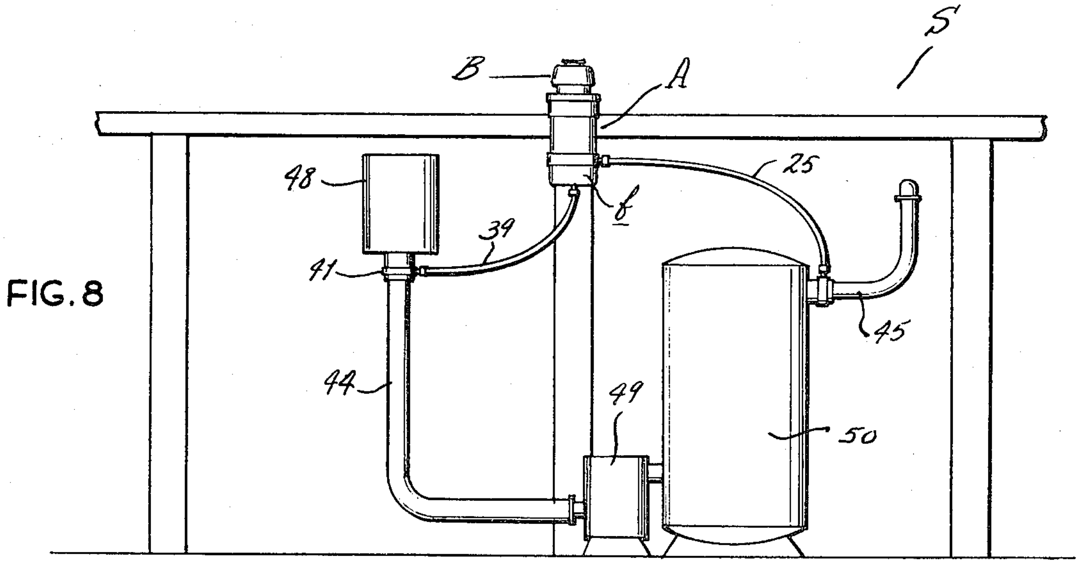
FIG. 8 is a schematic view of a liquid circulating system incorporating the feeder equipped with the disposable chemical container.

The use of feeder A within a liquid circulating system may be readily demonstrated by reference to FIG. 8 wherein the same is shown as usable within a swimming pool system. Therein, feeder A is mounted, as by a strap 46, depending from an extension 47 projecting radially outwardly of the upper end portion of casing 1, upon a cross member (not shown) in a slightly elevated position relative to, and adjacent, the pool wall. Discharge pipe 39 is connected through strap 41 to suction hose 44 which latter leads from a skimmer 48 through which water is drawn from the pool for circulation by a conventional pump 49; said latter being connected to the usual filter 50, which in its upper portion discharges through return hose 45 for storing the now filtered and treated fluid to the pool. The treated material is thus drawn, as by suction, from float chamber f into a suction hose 44 for ultimate restoration to the pool. However, inlet tube 25 will cause a continual withdrawing of the liquid for treating purposes.

The operation of feeder A is as follows: With feeder A mounted in a liquid circulating system as in the manner shown in FIG. 8 and described above, and with casing 1 empty, the operator may insert his hand into casing 1 and adjust weir 6 upwardly or downwardly, as may be necessary, for requisite alignment of weir inlet ports 9 with the particular gradation of scale m which indicates the desired concentration of the liquid to be treated. Thus, for maximum concentration weir 6 will be in full "up" position (FIG. 4). The operator then takes container B filled with compound t, removes the closure (not shown) over opening 16, and inserts said container into casing 1 through aperture a in cap 4' with weir 6 relatively penetrating opening 16. The insertion continues until container B engages boss shoulders s when the same is in full operative position constituting a source of compound supply for feeder A as well as serving as the dissolving compartment, as will be shown.

The liquid to be treated is admitted to casing 1 through flow meter 23 and into chamber 20 whence it flows or rises through openings 19 as well as through spacing c until it reaches the level of weir inlet ports 9. During such flow or rising, the liquid will cause that portion of the compound t within its path of flow to be dissolved and the developed solution will thus flow from container B by way of inlet ports 9, through and along the bore of weir 6 for discharge through outlet port 9 for delivery to float chamber f, for emission ultimately through discharge pipe 39 and into the system S as described above. It will be seen that the annular volume 15 surrounding container B allows the incoming liquid, such as water, to rise therein with the displaced air flowing outwardly to cap aperture a. As pointed out hereinabove the width of slots 18 and sleeve 17 are of such limited character as to block any fragments or particles of treatment compound t which are partially or incompletely dissolved from escaping container B through the spacing c. The height of sleeve 17 is such that similar fragments or particles of the compound could not move thereover. In view of the incoming liquid surging upwardly through openings 19 and spacing c weir 6 effectively serves as substantially the sole outlet for the developed solution.

After the contents of container B have been exhausted the same may be withdrawn and replaced by a full or new, loaded container. If the previous adjustment of weir 6 had provided the desired concentration, the user is spared the necessity of readjusting said weir 6 and thereby leaves the same in its already established position with the assurance that the particular concentration will be maintained with the subsequent container. On the other hand, weir 6 may be easily adjusted prior to insertion of the succeeding container B if a change in concentration is desired. Such adjustment is manifestly made with respect to scale m.

Therefore, the novel relationship of feeder weir 6 and container B provides attributes which constitute a marked advance in liquid treating devices utilizing throw away packages of chemical. Presently known disposable chemical containers incorporate a vertically arranged series of scored members which require the user to punch out or sever the scoring member at the particular height which will approximately permit of a liquid level to obtain the desired concentration. Thus, the opening developed by removal of the scored portions provide an air escape outlet. With the present invention all such punching out or severing of scored members is obviated since the concentration is controlled by the simple adjustment of the weir 6. Furthermore, by reason of its threaded mounting weir 6 will permit a very fine degree of adjustment so that the number of concentration values obtainable within the range allowed by the effective height of weir 6 is most substantial, being a far cry from the handful or so of settings permissible with current containers. As pointed out above, with 16 threads to the inch, for every inch of threaded extent of weir 6 16 adjustments are permitted. The number of such adjustments is indeed infinite when one recognizes the possibilities of altering the thread thickness as well as the pitch and helical angles thereof. Additionally, certain current disposable compound canisters are designed to be threaded into the particular feeder unit which does render it difficult to effect the proper adjustment for the same. But, as pointed out, with the present invention weir 6 remains in position for assuring of the desired concentration, without concern by the user as to any inaccuracies developing by reason of the rotative movement of container B.

Having described my invention, what I claim and desire to obtain by Letters Patent is:

1. The combination of a chemical feeder for liquid circulating systems comprising a casing having a base wall and a side wall, a vertically presented weir engaged in said base wall, and a replaceable chemical-bearing container receivable within said casing, said container having a bottom wall and a side wall, means provided in said casing supportingly engaging said container bottom wall for presenting the container in vertically spaced relationship to said casing base wall, said container bottom wall being provided with an opening, said weir projecting in its upper portion through said container opening, said weir having an upper end of tapered configuration to facilitate penetration by said weir of the chemical within said container.

2. The combination as defined in claim 1 and further characterized by means for vertical adjustment of said weir comprising said casing bottom wall having a tapped opening, said weir being externally threaded throughout a predetermined portion of its length.

3. The combination as defined in claim 2 and further characterized by said weir external threads being of such thickness and pitch as to present approximately 16 threads to the inch.

4. The combination as defined in claim 1 wherein the opening in the container bottom wall is of a cross-section greater than said weir for defining an annular flow passage about said weir.

5. The combination as defined in claim 1 wherein said container bottom wall is provided with a plurality of apertures in surrounding relationship to said opening.

6. The combination as defined in claim 1 wherein said tapered upper end of said weir is closed, liquid inlet means provided on said weir adjacent to, and downwardly of, said tapered upper end, said weir having an open lower end constituting an outlet port.

* * * * *